Jan. 22, 1935.        H. HINTZE        1,988,947
ELECTRIC VALVE CONVERTING APPARATUS
Filed Dec. 1, 1932
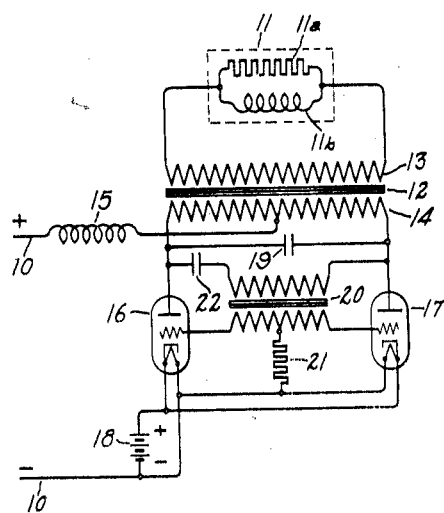
Inventor:
Helmut Hintze,
by Charles E. Tullar
His Attorney.

Patented Jan. 22, 1935

1,988,947

UNITED STATES PATENT OFFICE 1,988,947

ELECTRIC VALVE-CONVERTING APPARATUS

Helmut Hintze, Kopenick-Wendenschloss, Germany, assignor to General Electric Company, a corporation of New York Application December 1, 1932, Serial No. 645,299
In Germany December 16, 1931

2 Claims. (Cl. 175—363)

My invention relates to electric valve-converting apparatus, and more particularly to such apparatus adapted to operate at relatively high voltages, but requiring a control circuit energized at relatively low voltages.

There have heretofore been proposed numerous types of electric valve converting apparatus for transmitting energy between direct and alternating-current circuits, independent alternating-current circuits of the same or different frequencies, or between direct-current circuits of different voltages. Many of these arrangements of the prior art are particularly suitable for operating from high voltage circuits but at the same time require relatively low-voltage control circuits. For example, many of the arrangements of the prior art utilize electric valves of the heated cathode type in which an incandescent filament operates directly as a cathode or in which an independent heating coil is provided for an indirectly heated cathode. Also, in many cases, where the conductivity of the valves is controlled to control the energy transmitted between the circuits, a source or courses of relatively low-voltage biasing potential are required for the excitation circuits of the grids of the several electric valves. Heretofore, these relatively low-voltage control circuits have been energized by means of batteries which require periodic recharging, or by means of auxiliary rectifying apparatus.

It is an object of my invention, therefore, to provide an electric valve-converting system utilizing relatively low-voltage control circuits and including new and simplified means for energizing the relatively low-voltage control circuits.

In accordance with one embodiment of my invention, direct- and alternating-current circuits are interconnected through an electric valve-converting apparatus including a plurality of grid-controlled, hot cathode, electric valves. There is provided an auxiliary battery for heating the cathodes of the electric valves and furnishing a source of bias potential for the grid circuits of the electric valves, and this battery is connected in series with the load current of the apparatus, which is effective to maintain the battery in a charged condition.

For a better understanding of my invention together with other and further objects thereof, reference is had to the following description, taken in connection with the accompanying drawing, and its scope will be pointed out in the appended claims. The single figure of the drawing illustrates an arrangement embodying my invention for transmitting energy from a direct-current supply circuit to a single-phase alternating-current load circuit.

Referring more particularly to the drawing, there is illustrated an arrangement for transmitting energy from a direct-current circuit 10 to an alternating-current load circuit 11, diagrammatically illustrated as comprising resistance 11a and reactance 11b. This apparatus comprises a transformer 12 provided with a secondary winding 13 connected to the alternating-current circuit 11 and a primary winding 14 having an electrical midpoint connected to one side of the direct-current circuit through a smoothing reactor 15, and end terminals connected to the other side of the direct-current circuit through electric valves 16 and 17. Electric valves 16 and 17 are each provided with an anode, a control grid, and an indirectly heated cathode and cathode heater. A battery 18 is connected between the common cathode circuit of electric valves 16 and 17 and the other side of the direct-current circuit, while the cathode heaters of electric valves 16 and 17 are connected directly across the battery 18, as illustrated. A commutating capacitor 19 is preferably connected between electric valves 16 and 17. In order periodically to render the valves 16 and 17 alternately conductive and non-conductive, their grids are connected to their common cathode circuit through opposite halves of the secondary winding of the grid transformer 20, a current-limiting resistor 21, and the auxiliary battery 18 connected to impress a negative bias upon the grids of the electric valves. The primary winding of the grid transformer 20 may be energized from any suitable source of alternating potential of a frequency which it is desired to supply the circuit 11, or, in case the apparatus is to operate at an independent frequency, this winding may be connected directly across the winding 14 through a phase-advancing capacitor 22, as is well understood in the art.

The general principles of operation of the above described converting apparatus, known in the art as a parallel inverter, will be well understood by those skilled in the art. In brief, if one of the electric valves, for example, the valve 16, is initially rendered conductive, current will flow through the left-hand portion of the winding 14 and electric valve 16 inducing a half cycle of alternating potential in the transformer 12. During this interval the capacitor 19 becomes charged to such a polarity that when, 180 electrical degrees later electric valve 17 is rendered conductive, capacitor 19 is effective to commutate the current from the valve 16 to the valve 17. Current now flows through the right-hand portion of the winding 14 inducing a half cycle of alternating potential of opposite polarity in the transformer 12. In this manner current is successively commutated between the valves 16 and 17, supplying an alternating current to the load circuit 11. In the particular arrangement illustrated, the frequency will be dependent primarily upon the size of the capacitor 22, the time required for its successive charging and discharging controlling the time between the successive excitation of the grids of electric valves 16 and 17.

The above described apparatus is particularly suitable for operation between relatively high voltage circuits, while, as stated above, it is usually preferable to have relatively low voltage for energizing the cathode heaters of the electric valves. This is accomplished in the illustrated embodiment by connecting the cathode heaters of the electric valves 16 and 17 across the auxiliary battery 18. If these heaters were energized from an independent battery, however, it would require frequent charging with the consequent disadvantages. By connecting the battery 18 in series with the load current of the converting apparatus as illustrated, however, the load current flowing between the circuits 10 and 11 flows also through the battery 18, maintaining it in a charged condition. It will be noted that this auxiliary battery 18 also serves as a source of negative bias potential in the grid circuits of the electric valves, a feature which is necessary with electric valves of certain characteristics or when used in certain converting circuits.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a direct-current circuit, an alternating-current circuit, an electric valve-converting apparatus interconnecting said circuits and including an inductive winding and a plurality of electric valves each provided with a heated cathode, a battery connected in series circuit with the load current of said apparatus, and a circuit for heating said cathodes from said battery.

2. In combination, a direct-current circuit, an alternating-current circuit, an electric valve-converting apparatus interconnecting said circuits and including an inductive winding and a plurality of electric valves each provided with a control grid, a bias battery connected in series circuit with the load current of said apparatus, and an excitation circuit for said grids including said bias battery.

HELMUT HINTZE.